(12) United States Patent
Chung et al.

(10) Patent No.: US 9,448,672 B2
(45) Date of Patent: Sep. 20, 2016

(54) TOUCH PANEL STRUCTURE AND FABRICATION METHOD FOR THE SAME

(71) Applicant: Industrial Technology Research Institute, Hsinchu (TW)

(72) Inventors: Sheng-Feng Chung, Hsinchu (TW); Cheng-Yi Shih, Tianzhong Township, Changhua County (TW); Shu-Yi Chang, Kaohsiung (TW); Su-Tsai Lu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 66 days.

(21) Appl. No.: 14/136,790

(22) Filed: Dec. 20, 2013

(65) Prior Publication Data

US 2015/0177867 A1 Jun. 25, 2015

(51) Int. Cl.
*G06F 3/044* (2006.01)

(52) U.S. Cl.
CPC ..... *G06F 3/044* (2013.01); *G06F 2203/04102* (2013.01); *G06F 2203/04103* (2013.01); *G06F 2203/04111* (2013.01)

(58) Field of Classification Search
CPC ........... G06F 2203/04111; G06F 2203/04112; G06F 2203/04113; C09D 11/52; H05K 13/00
See application file for complete search history.

(56) References Cited

U.S. PATENT DOCUMENTS

| | | |
|---|---|---|
| 7,301,351 B2 | 11/2007 | Deangelis et al. |
| 8,508,680 B2 | 8/2013 | Geaghan et al. |
| 2009/0242283 A1* | 10/2009 | Chiu .......................... 178/20.01 |
| 2010/0164890 A1* | 7/2010 | Lee ........................ G06F 1/1626 345/173 |
| 2010/0261119 A1* | 10/2010 | Li et al. ........................ 430/319 |

(Continued)

FOREIGN PATENT DOCUMENTS

| | | |
|---|---|---|
| CN | 101776967 A | 7/2010 |
| CN | 102625930 A | 8/2012 |

(Continued)

OTHER PUBLICATIONS

Lee, Taik-Min et al., Development of a gravure offset printing system for the printing electrodes of flat panel display, Elsevier: Thin Solid Films, 2010, pp. 3355-3359.

(Continued)

*Primary Examiner* — Kevin M Nguyen
(74) *Attorney, Agent, or Firm* — Muncy, Geissler, Olds & Lowe, P.C.

(57) ABSTRACT

A touch panel structure includes a transparent substrate having a touch area and a frame wire area, X conductive electrodes, Y conductive electrodes, X conductive connecting sections connecting the X conductive electrodes along a first direction, frame wires, insulated layers and Y conductive connecting bridges on the insulated layers. The X and Y conductive electrodes are respectively arranged in an array in the touch area and interlaced with each other. The X and Y conductive electrodes are electrically connected to an external circuit via the frame wires. The insulated layers each cover one of the X conductive electrodes and two of the Y conductive electrodes. The Y conductive electrodes are electrically connected to each other via the Y conductive connecting bridges along a second direction. A conducting material is performed by one-time printing to pattern the X and Y conductive electrodes, X conductive connecting sections and frame wires.

19 Claims, 7 Drawing Sheets

(56) References Cited

U.S. PATENT DOCUMENTS

| | | |
|---|---|---|
| 2011/0109564 A1 | 5/2011 | Lee et al. |
| 2011/0227842 A1* | 9/2011 | Lin et al. ............... 345/173 |
| 2011/0262631 A1* | 10/2011 | Lee et al. ............... 427/123 |
| 2014/0251674 A1* | 9/2014 | Gao ............... H01R 12/79 174/261 |

FOREIGN PATENT DOCUMENTS

| | | |
|---|---|---|
| CN | 1030942445 A | 5/2013 |
| TW | 200526090 | 8/2005 |
| TW | I272520 B | 2/2007 |
| TW | 201131456 A | 9/2011 |
| TW | I403945 B | 8/2013 |
| TW | M466310 U | 11/2013 |
| TW | 201349041 A | 12/2013 |
| WO | WO 2013/128208 A1 | 9/2013 |

OTHER PUBLICATIONS

Sankaran, Ashwin K. et al., Effect of viscoelasticity on liquid transfer during gravure printing, Elsevier: Journal of Non-Newtonian Fluid Mechanics, 2012, pp. 64-75.

Choi, Nackbong et al., A modified offset roll printing for thin film transistor applications, Elsevier: Microelectronics Engineering, 2012, pp. 93-97.

Lee, Taik-Min et al., Design and fabrication of printed transparent electrode with silver mesh, Elsevier: Microelectronics Engineering, 2012, pp. 556-560.

Kim, Inyoung et al., Effect of ink cohesive force on gravure offset printing, Elsevier: Microelectronics Engineering, 2012, pp. 587-589.

* cited by examiner

TOUCH PANEL STRUCTURE AND FABRICATION METHOD FOR THE SAME

TECHNICAL FIELD

The disclosure relates to a touch panel structure. Particularly, the disclosure relates to a touch panel structure and fabricating method for the same.

BACKGROUND

The display technology has been developed towards more humane man-machine interface. A display with a touch panel has become mainstream, which replaces the keyboard, mouse and other input devices, so it is easier for users to operate various products in the IT equipment than before. Therefore, the touch panels, which can be easily operated, will be widely used in the near future. For example, the touch panels may be applied to car navigations, game consoles, public information systems (e.g., vending machines, automatic teller machine (ATM), navigation systems), industrial use or small electronic products (e.g., a personal digital assistant (PDA), or e-book). The demand for touch panel is growing in the market, so the development of touch panel technology will have been developed increasingly and enormously in the next few years.

The smart-phone market is increasing rapidly in the world, so is the capacitive touch panel. Generally, the touch panel structure comprises a single layer of Indium Tin Oxide conductive film for an electrically conductive electrode. However, during the forming of ITO electrode, lithography and laser are always applied to relevant location of the substrate to pattern the desired electrode. The machines of the photolithographic shadow method or the laser method are very expensive and difficult to maintain, and these methods also have environmental issues. Therefore, it is important to improve the performance of the touch panel and reduce the manufacturing cost of the touch panel structure.

SUMMARY

According to one embodiment, a touch panel structure comprises a transparent substrate, a plurality of X conductive electrodes, a plurality of Y conductive electrodes, a plurality of X conductive connecting sections, a plurality of frame wires, a plurality of insulated layers and a plurality of Y conductive connecting bridges. The transparent substrate has a touch area and at least one frame wire area. The plurality of X conductive electrodes is arranged in an array in the touch area. The plurality of Y conductive electrodes is arranged in an array in the touch area. The plurality of X conductive electrodes and the plurality of Y conductive electrodes are interlaced with each other. The plurality of X conductive connecting sections is connected to the plurality of X conductive electrodes adjacent to each other to electrically connect the plurality of X conductive electrodes along a first direction. The plurality of frame wires are disposed in the at least one frame wire area, wherein an external circuit is electrically connected to the plurality of X conductive electrodes and the plurality of Y conductive electrodes via the plurality of frame wires. The plurality of insulated layers each covers one of the plurality of X conductive electrodes and a portion of two of the plurality of Y conductive electrodes. The plurality of Y conductive connecting bridges is disposed on the plurality of insulated layers, for electrically connecting the plurality of conductive Y conductive electrodes in a second direction. The conducting material is performed by means of an one-time printing manner to pattern the plurality of X conductive electrodes, the plurality of Y conductive electrodes, the plurality of X conductive connecting sections and the plurality of frame wires on the transparent substrate.

According to one embodiment, a fabricating method of touch panel structure comprises the following steps. A plurality of X conductive electrodes, a plurality of Y conductive electrodes, a plurality of X conductive connecting sections and a plurality of frame wires are patterned on a transparent substrate by a one-time printing manner. The transparent substrate has a touch area and at least one frame wire area. The plurality of X conductive electrodes and the plurality of Y conductive electrodes are respectively arranged in an array in the touch area and interlaced with each other. The plurality of frame wires are disposed in the at least one frame wire area. The plurality of X conductive connecting sections is connected to the plurality of X conductive electrodes adjacent to each other to electrically connect the plurality of X conductive electrodes along a first direction. An external circuit is electrically connected to the plurality of X conductive electrodes, the plurality of Y conductive electrodes and the plurality of X conductive connecting sections via the plurality of frame wires. A plurality of insulated layers is formed and each insulated layer covers one of the plurality of X conductive electrodes and a portion of two of the plurality of Y conductive electrodes. A plurality of Y conductive connecting bridges is formed on the plurality of insulated layers, for electrically connecting the plurality of Y conductive electrodes along a second direction.

According to one embodiment, a fabricating method of a touch panel structure comprises the following steps. A plurality of Y conductive connecting bridges is formed on a touch area of a transparent substrate. A plurality of insulated layers is formed on the plurality of Y conductive connecting bridges, respectively. A plurality of X conductive electrodes and a plurality of Y conductive electrodes, a plurality of X conductive connecting sections and a plurality of frame wires are patterned on the transparent substrate by a one-time printing manner. The plurality of X conductive electrodes and the plurality of Y conductive electrodes are respectively arranged in an array in the touch area and are interlaced with each other. The plurality of X conductive electrodes is disposed on the plurality of insulated layers, respectively, to electrically connect the plurality of X conductive electrodes along a first direction. The plurality of Y conductive electrodes covers edges of the plurality of Y conductive connecting bridges, to electrically connect the plurality of Y conductive electrodes along a second direction. The plurality of frame wires is disposed in at least one frame wire area of the transparent substrate. An external circuit is electrically connected to the plurality of X conductive electrodes, the plurality of Y conductive electrodes and the plurality of X conductive connecting sections via the plurality of frame wires.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure, wherein:

FIGS. 4a to 4c are schematic views of a touch panel structure in fabrication processes according to a third embodiment of the disclosure; and.

DETAILED DESCRIPTION

The detailed features and advantages of the disclosure are described below in great detail through the following embodiments, the content of the detailed description is sufficient for those skilled in the art to understand the technical content of the present disclosure and to implement the disclosure there accordingly. Based upon the content of the specification, the claims, and the drawings, those skilled in the art can easily understand the relevant objectives and advantages of the disclosure.

This disclosure proposes a touch panel structure and a fabricating method for printing conductive electrodes and frame wires of the touch panel structure in a directly printing manner. The conductive electrodes or frame wires may be made of metal wires, and the touch area of the touch panel structure has the high transparent conductive electrodes disposed, and the frame wire has narrower width. Additionally, the fabrication method has advantages of being simple, low cost and quick manufacturing for a large touch panel, having the roll-to-roll process and mass productivity. Furthermore, the disclosure can be applied to a flexible electronic circuit panel and devices.

Figure 1A:
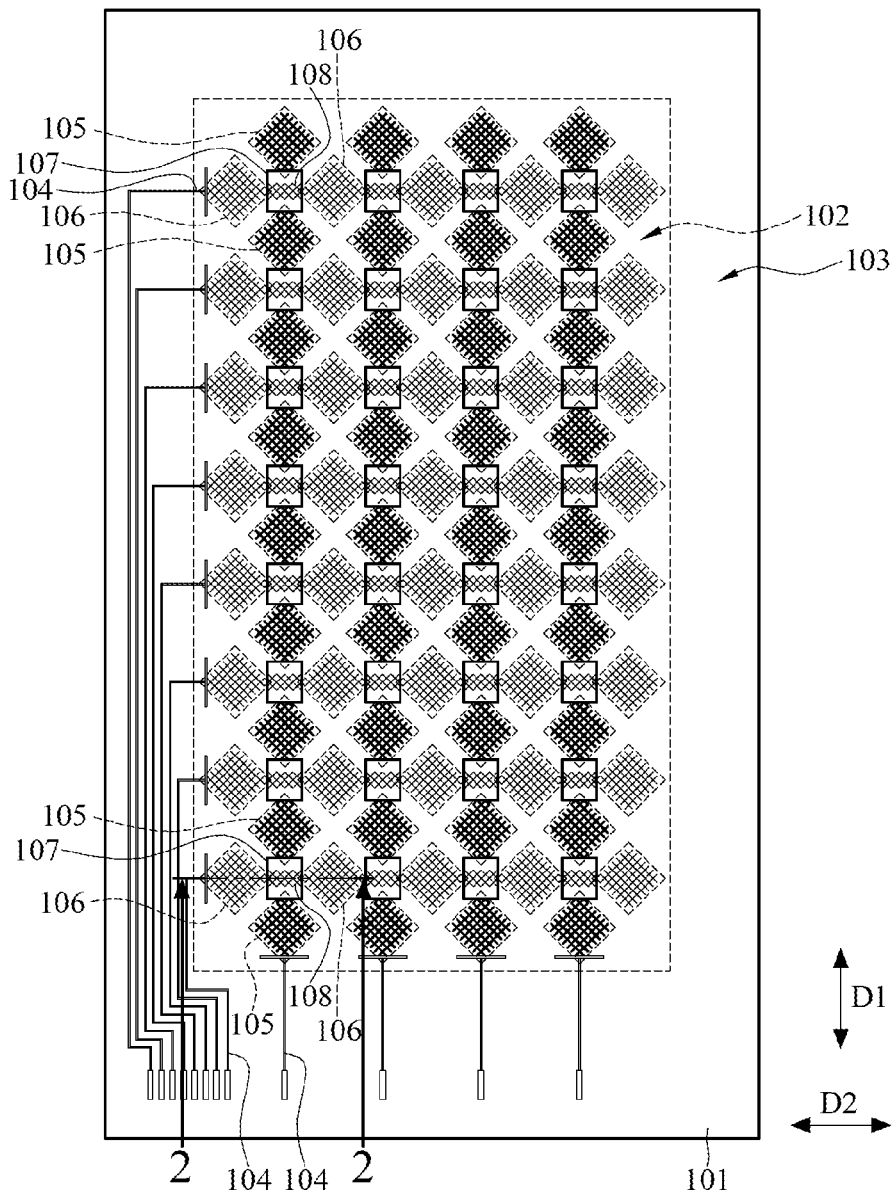
FIG. 1a is a top view of a touch panel structure according to an embodiment of the disclosure.

FIG. 1a is a top view of a touch panel structure 100 according to an embodiment of the disclosure. As shown in this embodiment, a touch panel structure 100 comprises a transparent substrate 101 having a touch area 102 and at least one frame wire area 103. In this embodiment, the at least one frame wire area 103 is located at periphery of the touch area 102, but not limited to the embodiment. The touch panel structure 100 further comprises a plurality of X conductive electrodes 105, a plurality of Y conductive electrodes 106, a plurality of X conductive connecting sections 109, a plurality of insulated layers 107 and a plurality of Y conductive connecting bridges 108 all disposed in the touch area 102 of the substrate 101. The touch panel structure 100 also comprises a plurality of frame wires 104 in the frame wire area 103 of the transparent substrate 101. An external circuit (not shown) is electrically connected to the plurality of X conductive electrodes 105 and the plurality of Y conductive electrodes 106 via the plurality of frame wires 104. As shown in FIG. 1a, the plurality of X conductive electrodes 105 and the plurality of Y conductive electrodes 106, both made of thin metal wires, are interlaced with each other to form an electrode sensing zone for sensing gesture. The electrode sensing zone, formed by the plurality of X conductive electrodes 105 and the plurality of Y conductive electrodes 106, features in high light transmittance in the viewing area of the touch panel. In this embodiment, the plurality of Y conductive electrodes 106 is arranged in an array in the touch area, the plurality of X conductive electrodes 105 is also arranged in an array in the touch area. The plurality of X conductive electrodes 105 and the plurality of Y conductive electrodes 106 are interlaced with each other. In this embodiment, "being interlaced with each other" is defined as one the plurality of X conductive electrodes 105 is surrounded by four of the plurality of Y conductive electrodes 106 from the up, down, left and right directions, and one of the plurality of Y conductive electrodes 106 is surrounded by four of the plurality of X conductive electrodes 105 from the up, down, left and right directions. In this embodiment, the plurality of X conductive electrodes 105 is electrically connected to each other along a first direction D1 in series via the plurality of X conductive connecting sections 109, such that a plurality of lines of X conductive electrodes 105 are formed and parallel to each other. Also, the material of the plurality of X conductive electrodes 105 is the same as that of the plurality of X conductive connecting sections 109. Since being separated from each other by a distance, the plurality of Y conductive electrodes 106 is connected to each other along a second direction D2 in series via the plurality of Y conductive connecting bridges 108, such that a plurality of lines of Y conductive electrodes 106 which are parallel to each other is formed. Moreover, when each Y conductive connecting bridge 108 passes across the plurality of X conductive connecting sections 109, a plurality of insulated layers 107 needs to be disposed for separating the two Y conductive electrodes 106 and the Y conductive connecting bridge 108 from the X conductive connecting section 109 underneath the insulated layer 107. Therefore, the two Y conductive electrodes 106 are not electrically connected to the X conductive connecting section 109, and there is mutual capacitance generated between the plurality of X and Y conductive electrodes 105 and 106. However, the touch panel structure of the present disclosure is not limited in the embodiment. For person skilled in the art of the field, the plurality of Y conductive electrodes 106 may be connected in series to each other through the plurality of Y conductive connecting bridges 108, and the plurality of X conductive electrodes 105 separated from each other are electrically connected through the plurality of X conductive connecting sections 109, and the plurality of insulated layers 107 is disposed between the plurality of X conductive electrodes 105 and the plurality of Y conductive electrodes 106. Moreover, in this embodiment, the first direction D1 (up-and-down direction in the figures) is substantially orthogonal to the second direction D2 (left-and-right direction in the figures), but the disclosure is not limited thereto.

Figure 1B:
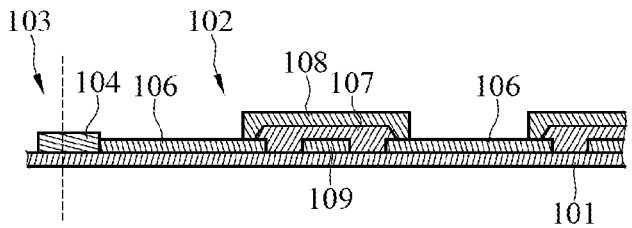
FIG. 1b is a side view of a touch panel structure according to an embodiment of the disclosure.

FIG. 1b is a side view of the touch panel structure 100 according to the embodiment of the disclosure. As shown in this embodiment, a touch panel structure 100 has a transparent substrate 101. The touch panel structure 100 comprises a plurality of frame wires 104, a plurality of transparent electrodes (i.e., a plurality of X conductive electrodes 105, Y conductive electrodes 106 and a plurality of X conductive connecting sections 109), a plurality of insulated layers 107 and a plurality of Y conductive connecting bridges 108 all disposed on the transparent substrate 101. The two X conductive electrodes 105 adjacent to each other are separated from the Y conductive electrode 106 through one of the plurality of insulated layers 107. Each insulated layer 107 covers one of the plurality of X conductive connecting sections 109 and a portion of two of the plurality of Y conductive electrodes 106 adjacent to the certain insulated layer 107. In this disclosure, "two of the Y conductive electrodes 106 being adjacent to the certain insulated layer 107" indicates the two Y conductive electrodes 106 are located at two opposite side of the insulated layer 107 along the second direction D2 in FIG. 1A. A portion of two of the plurality of Y conductive electrodes 106 which are covered by the insulated layer 107 indicates the opposite edges of two Y conductive electrodes 106 which face to each other. Then, the Y conductive electrodes 106 adjacent to each other are electrically connected to each other by means of the plurality of Y conductive connecting bridges 108 extending across the insulated layer 107 and above the X conductive connecting section 109 and the plurality of X conductive electrodes 105. The plurality of X conductive electrodes 105 electrically connects to each other through the plurality of conductive connecting bridges 108 and electrically non-connects (i.e., do not connect) to the plurality of Y conductive electrodes 106 through the plurality of insulated layers 107. However, the touch panel structure in this embodiment is not limited to the present disclosure. For person skilled in the art of the field, the plurality of Y conductive electrodes 106 may be connected in series to each other, and the plurality of X conductive electrodes 105 separated from each other by a distance are electrically connected through the plurality of conductive connecting bridges 108, and the plurality of insulated layers 107 are disposed between the plurality of X conductive electrodes 105 and the plurality of Y conductive electrodes 106.

In order to pattern the touch panel structure 100, mesh-like patterns of the plurality of X and Y conductive electrodes 105 and 106, the plurality of X conductive connecting sections 109, the plurality of insulated layers 107, the plurality of Y conductive connecting bridges 108 and the plurality of frame wires 104 can be designed in a gravure. Either of the groups of the plurality of X or Y conductive electrodes 105 and 106 is connected to each other and spaced apart from another group, and then is transferred to the transparent substrate 101 by gravure off-set printing. The plurality of frame wires 104 also are printed on the certain positions of the transparent substrate 101 at the same time. The materials of the plurality of X and Y conductive electrodes 105 and 106, the plurality of X conductive connecting sections 109 and the frame wires 104 may be a metal, an inorganic material or an organic material. The metal is a silver conductive ink, a copper conductive ink, a carbon conductive ink or a complex metal conductive ink. The inorganic material is an Indium Tin Oxide (ITO), a Fluorine doped tin oxide (FTO), a Zinc oxide (ZnO), an Al-doped ZnO(AZO), an Indium Zinc Oxide (IZO). The structure of the conductive electrode may be made from a single layer ITO (SITO), a double layer ITO (DITO), a one-glass solution (OGS) or a touch on lens (TOL). The organic material is conductive polymers, a Carbon nanotube or a Graphene. Furthermore, the insulated layers 107 may be an inorganic or organic material, which the inorganic material is SiO2, SiNx, a photoresist; the organics material is acrylic, epoxy, ethylene vinyl acetate (EVA) or a photoresist. The plurality of Y conductive connecting bridges 108 are an organic material or an inorganic material, wherein the inorganic material is a metal, a metal composite or a metal oxide; and the organic material is a conductive ink, a conductive polymer or a conductive carbon. Therefore, the plurality of X and Y conductive electrodes 105 and 106, X conductive connecting sections 109 and frame wires 104 may be made of mesh-like wires or solid wires. The electrodes and wires can be printed at one time to produce different conductive wire in width, thickness, and the wire resistance value in a process according to requirement.

The embodiment of the touch panel structure discloses the transparent substrate 101 which may be a glass, a thin-glass, or polymer material. The transparent substrate 101 is flexible, and a flexural radius of the transparent substrate 101 is less than about 100 mm.

Figure 2A:
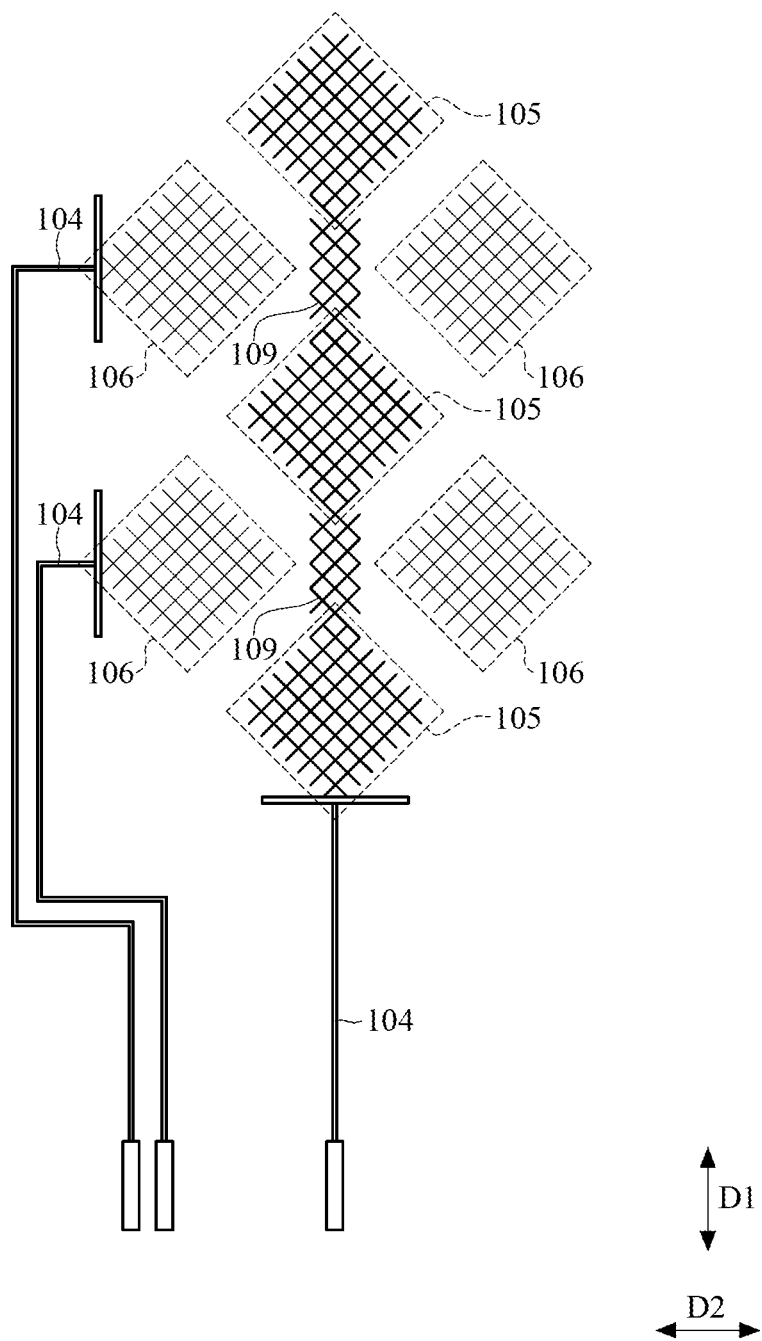
FIGS. 2a to 2c are schematic views of a touch panel structure in fabrication processes according to another embodiment of the disclosure.
Figure 2B:
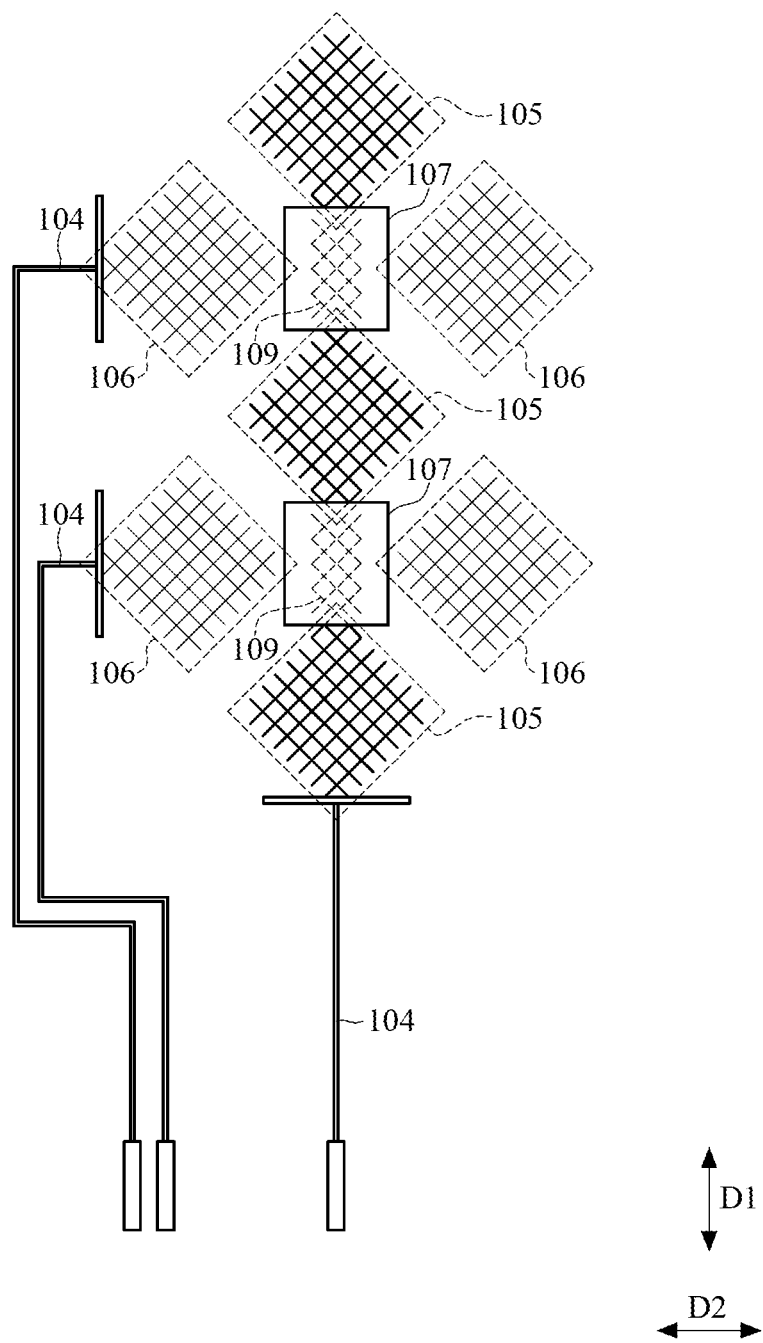
Figure 2C:
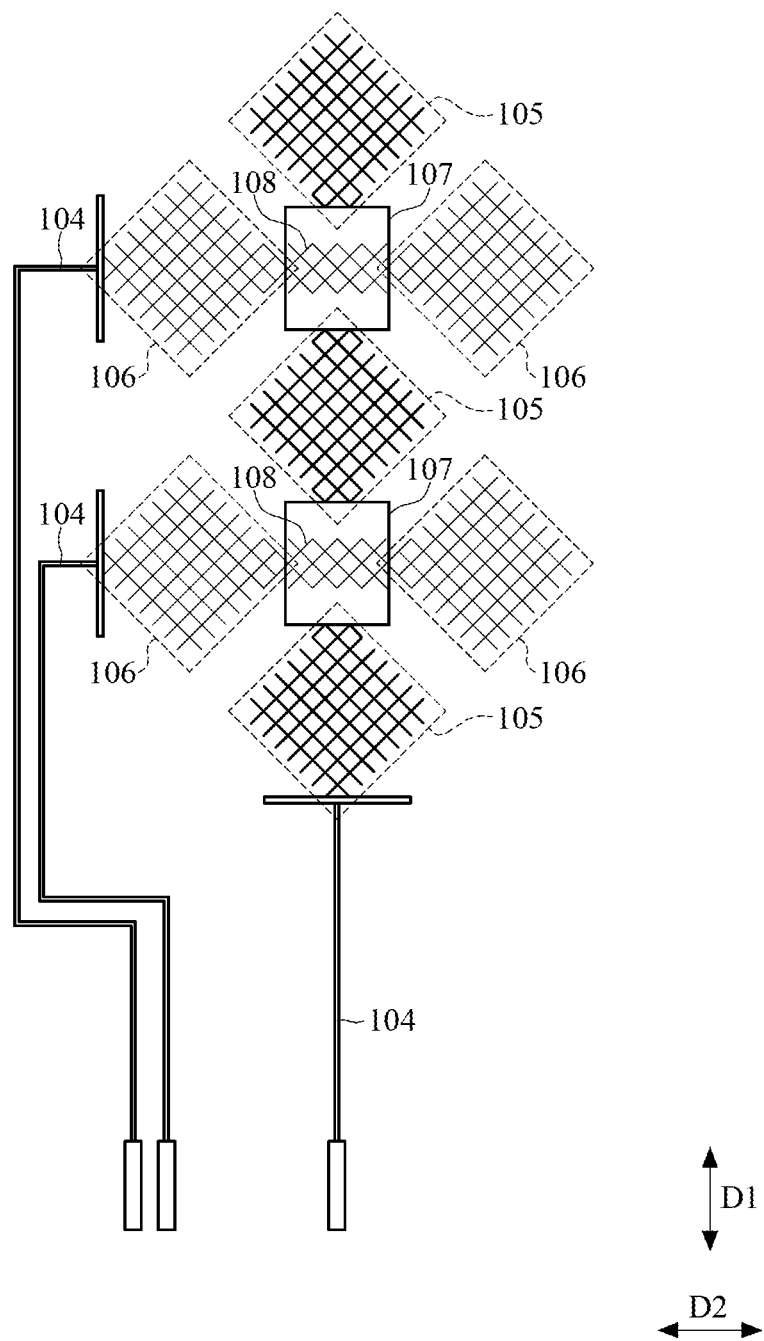
Figure 3:
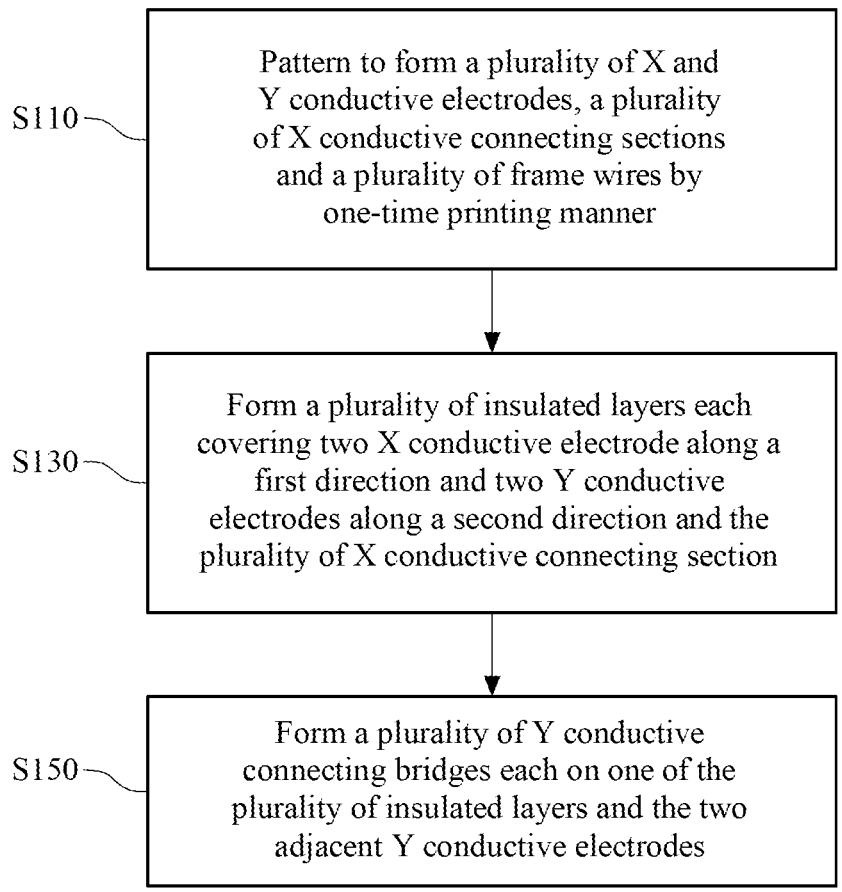
FIG. 3 is a flow chart of a fabrication method for a touch panel structure according to another embodiment of the disclosure.

The following describes the fabricating method for the touch panel structure. FIGS. 2a-2c are schematic views of a touch panel structure 200 in different fabrication processes according to another embodiment of the disclosure, and FIG. 3 is a flow chart of the fabrication method for the touch panel structure 200 according to another embodiment of the disclosure. As shown in FIG. 2a and FIG. 3, a plurality of X and Y conductive electrodes 105 and 106, a plurality of X conductive connecting sections 109 and a plurality of frame wires 104 are patterned by means of using a gravure off-set printing manner at one time for fabricating a first layer (Step S110). The plurality of X and Y conductive electrodes 105 and 106 and the plurality of X conductive connecting sections 109 may be a mesh-like structure formed in a touch area of a transparent substrate, but not limited to the disclosure. The plurality of conductive electrodes, frame wires with different widths, thicknesses or conductive electrical resistance values varied based on the requirement of design are transferred to form the plurality of X and Y conductive electrodes 105 and 106, the plurality of X conductive connecting sections 109 and the plurality of frame wires 104 on the transparent substrate. The transparent substrate has a touch area and at least one frame wire area. In general, the X conductive electrode always is a signal receiver (Rx), and the Y conductive electrode always is a signal transmitter (Tx). Each group of the plurality of X and Y conductive electrodes 105 and 106 is arranged in an array, respectively, and the plurality of X and Y conductive electrodes 105 and 106 are interlaced with each other. The plurality of X conductive electrodes 105 adjacent to each other are electrically connected via the X conductive connecting sections 109 along a first direction D1. The plurality of frame wires 104 is electrically connected to the plurality of X conductive electrodes 105 connected in series and the plurality of Y conductive electrodes 106, respectively, so as to connect the plurality of X and Y conductive electrodes 105 and 106 with an external circuit. The width of conductive electrode is less than about 10 μm, and then the mesh-like conductive electrodes will be transparent. In this embodiment, the width of conductive electrode is less than 5 μm, so the mesh-like conductive electrodes of the embodiment has high transparency. In addition, the plurality of frame wires 104 in the frame wire area may be solid wire. Wire lengths of the plurality of frame wires 104 are varied according to controlling the resistance values of frame wires. Also, the resistance values of frame wires match the mesh-like conductive electrodes in the touch area to make the resistance of an effective loop consistent. In general, as long as the width of wire is less than 20 μm, a desired resistance value and a narrower frame design may be achieved. Therefore, according to demands, the plurality of conductive electrodes, X conductive connecting sections and frame wires with different widths, thicknesses, and resistance values are patterned on the transparent substrate by one-time printing manner.

As shown in FIGS. 2b and 3, a plurality of insulated layers 107 is formed on the plurality of X and Y conductive electrodes 105 and 106 and the plurality of X conductive connecting section 109 of the touch panel structure 200, for fabricating a second layer (Step S130). Each insulated layer 107 cover a X conductive connecting section 109, a portion of two X conductive electrodes 105 both connected to the X conductive connecting section 109 along a first direction D1 and a portion of two Y conductive electrodes 106 respectively located at two opposite side of the X conductive electrode 105 along a second direction D2. The plurality of insulated layers 107 is used for isolating the plurality of X conductive electrodes 105 from the plurality of Y conductive electrodes 106 to make the plurality of X and Y conductive electrodes 105 and 106 not connected with each other (being non-conductive). Also, a mutual capacitance between them will be generated. The touch panel structure 200 can be applied to the capacitive touch panel. The second layer of the fabrication method also can be fabricated by the gravure off-set printing manner to print the plurality of insulated layers 107 on the position where the plurality of X and Y conductive electrodes 105 and 106 are close to each other. In other words, the plurality of insulated layers is formed on the transparent substrate and each covers one X conductive connecting section 109 and a portion of two Y conductive electrode 106 adjacent to the X conductive connecting section 109. That is to say, each of the plurality of insulated layers 107 with different shapes and thicknesses is formed on each of the intersections of the plurality of X and Y conductive electrodes 105 and 106 by means of the one-time printing manner, and therefore, the plurality of X and Y conductive electrodes 105 and 106 are not electrically connected with each other because of the isolation of plurality of insulated layers 107 located between them.

As shown in FIGS. 2c and 3, a plurality of Y conductive connecting bridges 108 is formed on the plurality of insulated layers 107 and the two adjacent Y conductive electrodes 106 of the touch panel structure 200, for fabricating a third layer, so as to make the adjacent Y conductive electrodes 106 electrically connect with each other into a plurality of lines parallel to each other along a second direction D2 (Step S150). Therefore, the plurality of Y conductive electrodes 106 is connected in series and divided into different lines. The plurality of X or Y conductive connecting bridges is used for connecting the plurality of X or Y conductive electrodes and both across the insulated area which is printed on the top of the plurality of insulated layers for making the plurality of X or Y conductive electrodes connected with each other. The material of conductive connecting bridge may be the same as the conductive electrodes and the frame wires of the first layer. The design of circuit of Y conductive connecting bridge may be varied depending on other electrical circuits or capacitance characteristics of other layer of the touch panel structure 200. In general, the width of Y conductive connecting bridge is less than 10 µm, and the transparency of the Y conductive connecting bridge may will be increased. When the width of the Y conductive connecting bridge is less than 5 µm, the connecting area has better transparency. However, the touch panel structure 200 of the present disclosure is not limited in the embodiment. For person skilled in the art of the field, the plurality of conductive connecting bridges may be printed on the top of the plurality of insulated layers at one time in different shape, and thickness. Moreover, in this embodiment, the first direction D1 is substantially orthogonal to the second direction D2, but the disclosure is not limited thereto.

Figure 4A:
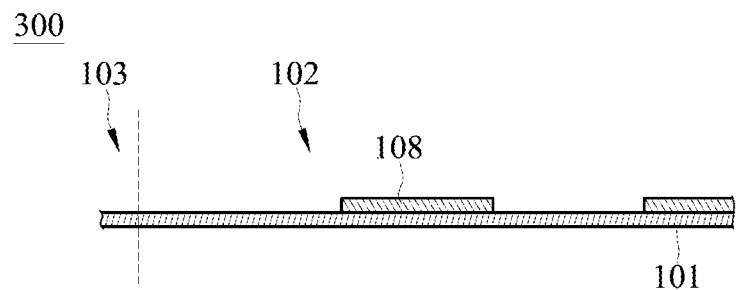
Figure 4B:
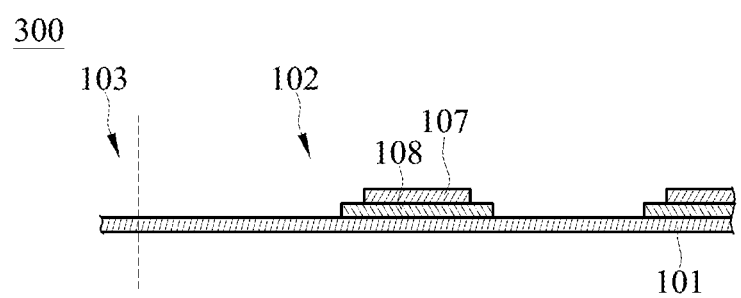
Figure 4C:
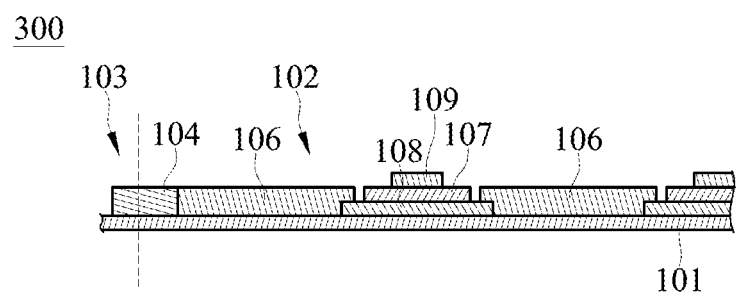
Figure 5:
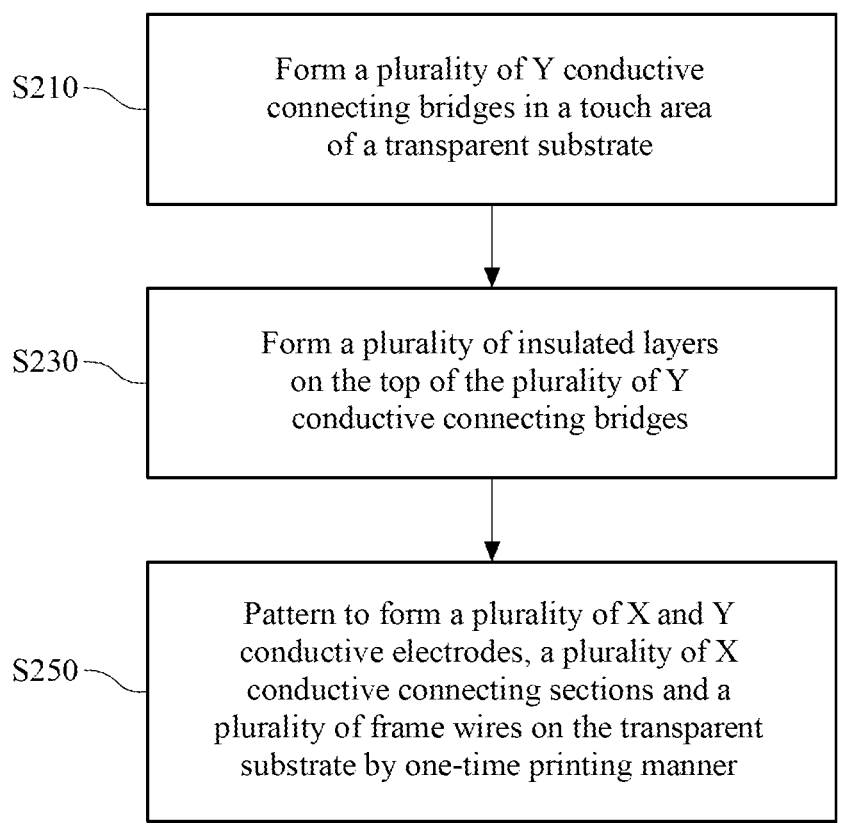
FIG. 5 is a flow chart of a fabrication method for a touch panel structure according to a third embodiment of the disclosure.

FIGS. 4a-4c are schematic views of a touch panel structure 300 in fabrication processes according to a third embodiment of the disclosure, and FIG. 5 is a flow chart of a fabrication method for the touch panel structure 300 according to the third embodiment of the disclosure. As shown in FIGS. 4a and 5, a plurality of Y conductive connecting bridges 108 is formed in a touch area of a transparent substrate 101 by the gravure off-set printing manner, for fabricating a first layer (Step S210). The Y conductive connecting bridge 108 is used for connecting circuits of X or Y conductive electrodes which will be printed in the following steps and being printed on the intersection of the X and Y conductive electrodes 105 and 106 in the touch area 102. In general, the width of conductive connecting area is less than 10 µm, and the transparency of the Y conductive connecting bridge will be increased. When the width of Y conductive connecting bridge 108 is less than 5 µm, the Y conductive connecting bridge 108 has better transparency. However, the touch panel structure 300 of the present disclosure is not limited in this embodiment. For person skilled in the art of the field, the plurality of Y or X conductive connecting bridges 108 of this embodiment could be differently designed to be printed at one time with different shapes and thicknesses.

As shown in FIGS. 4b and 5, a plurality of insulated layers 107 is respectively formed on the top of the plurality of Y conductive connecting bridges 108, for fabricating a second layer (Step S230). The insulated layer 107 is used for isolating the plurality of X conductive electrodes from the plurality of Y conductive electrodes which both will be formed in the following steps. Therefore, the effective circuits of the plurality of X and Y conductive electrodes are not electrically connected with each other insulated layer 107. Also, a mutual capacitance may also be generated between the plurality of X and Y conductive electrodes. The touch panel structure can be applied to the capacitive touch panel. This second layer of the touch panel structure 300 may be fabricated by means of using a gravure off-set printing manner to print the plurality of insulated layers 107 on the top of the plurality of Y conductive connecting bridges 108, respectively. The plurality of insulated layers 107 of this embodiment could be differently designed to be printed on the plurality of Y conductive connecting bridges at one time with different shapes and thicknesses based on different demand.

As shown in FIGS. 4c and 5, a plurality of X and Y conductive electrodes 105 and 106, a plurality of X conductive connecting sections 109 and a plurality of frame wires 104 are patterned on the transparent substrate 101 by the one-time printing manner (at the same time), for fabricating a third layer (Step S250). In this embodiment, the plurality of X and Y conductive electrodes (not shown) and the plurality of Y conductive electrodes 106 are arranged in an array, respectively, and are interlaced with each other. The plurality of X conductive connecting sections 109 is disposed on the plurality of insulated layers 107, respectively, such that the plurality of X conductive electrodes is electrically connected to each other into different lines parallel to each other along a first direction. The plurality of Y conductive electrodes 106 covers a portion of the two Y conductive connecting bridges 108 facing each other, such that the plurality of Y conductive electrodes 106 is electrically connected to each other into different lines parallel to each other along a second direction. Also, the plurality of X conductive electrodes is connected with each other through the X conductive connecting sections 109 along a first direction. The plurality of frame wires 104 is printed on at least one frame wire area 103 of the transparent substrate 101 and electrically connected to the plurality of X and Y conductive electrodes 105 and 106, respectively. Thus, the plurality of X and Y conductive electrodes 105 and 106 are electrically connected to an external circuit (not shown) via the plurality of frame wires 104. In this embodiment, the plurality of X and Y conductive electrodes 105 and 106 may be mesh-like structures in the touch area, but not limited to the disclosure. The conductive electrodes and frame wires may have different widths, thicknesses or conductive electrical resistance values, and then, they are transferred to form the plurality of X and Y conductive electrodes 105 and 106 and the plurality of frame wires 104 on the transparent substrate 101. The intersections of X and Y conductive electrodes 105 and 106 are disposed on the plurality of insulated layers 107, respectively. The plurality of Y conductive electrodes 105 and 106 may connect with each other below the insulated layers 107 through the plurality of Y conductive connecting bridges 108. Generally, the widths of the X and Y conductive electrodes 105 and 106 and X conductive connecting sections 109 are less than 10 µm, so the mesh-like conductive electrodes are transparent. In this embodiment, when the widths of conductive electrodes are less than 5 µm, the mesh-like conductive electrodes of the embodiment has high transparency. Moreover, the frame wires 104 may be solid wires, and wire lengths of the plurality of frame wires 104 varies according to controlling the resistance values of frame wires. Also, the resistance values of frame wires match the mesh-like conductive electrodes in the touch area to make the resistance of an effective loop resistance consistent. In general, as long as the width of wire is less than 20 µm, a desired resistance value and a narrower frame design may be achieved. Therefore, according to different demand, the plurality of X and Y conductive electrodes, X conductive connecting sections and frame wires with different widths, thicknesses, and resistance values are patterned on the transparent substrate by one-time printing manner.

Based on the touch panel structure and its fabricating method according to embodiments of the present disclosure, the X and Y conductive electrodes and the frame wire may be printed to be patterned on the transparent substrate by the gravure off-set printing, ink jet printing or nano-imprinting manner. Furthermore, the insulated layer may be printed to be patterned on the transparent substrate by the gravure off-set printing, the ink jet printing, the nano-imprinting, or the screen printing manner. Also, the X conductive connecting section may be printed to be patterned by the gravure off-set printing, the ink jet printing, the nano-imprinting, or a screen printing manner.

The above disclosed embodiments of the fabricating method for touch panel structure are a directly printing manner. The conductive electrodes or frame wires may be made from metal wires, and the touch area has the high transparent conductive electrodes, and the frame wire is a wire with narrower width. The disclosure also discloses the fabrication method which is simple, low cost, quicker manufacturing for a large touch panel, the roll-to-roll process and mass production. The disclosure can be applied to a flexible electronic circuit panel and devices.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

The embodiments were chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the disclosure pertains without departing from its spirit and scope. Accordingly, the scope of the disclosure is defined by the appended claims rather than the foregoing description and the exemplary embodiments described therein.

What is claimed is:

1. A touch panel structure, comprising:
   a transparent substrate having a touch area and at least one frame wire area;
   a plurality of X conductive electrodes arranged in an array in the touch area;
   a plurality of Y conductive electrodes arranged in an array in the touch area, and the plurality of X conductive electrodes and the plurality of Y conductive electrodes being interlaced with each other;
   a plurality of X conductive connecting sections connected to the plurality of X conductive electrodes adjacent to each other to electrically connect the plurality of X conductive electrodes along a first direction;
   a plurality of frame wires disposed in the at least one frame wire area, wherein an external circuit is electrically connected to the plurality of X conductive electrodes and the plurality of Y conductive electrodes via the plurality of frame wires;
   a plurality of insulated layers each covering one of the plurality of X conductive electrodes and a portion of two of the plurality of Y conductive electrodes; and
   a plurality of Y conductive connecting bridges disposed on the insulated layers, for electrically connecting the plurality of conductive Y conductive electrodes in a second direction;
   wherein the plurality of X conductive electrodes, the plurality of Y conductive electrodes, the plurality of X conductive connecting sections and the plurality of frame wires are patterned on the transparent substrate with a conducting material performed by means of an one-time printing manner, and
   wherein the transparent substrate is flexible.

2. The touch panel structure according to claim 1, wherein the plurality of X conductive electrodes, the plurality of Y conductive electrodes, the plurality of X conductive connecting sections and the plurality of frame wires are made from a single layer ITO (SITO), a double layers ITO (DITO), an one-glass solution (OGS) or a touch on lens (TOL).

3. The touch panel structure according to claim 1, wherein the material of the transparent substrate is a glass, a thin-glass, or a polymer material.

4. The touch panel structure according to claim 1, wherein a flexural radius of the substrate is less than 100 mm.

5. The touch panel structure according to claim 1, wherein the conducting material is a metal, an organic material or an inorganic material.

6. The touch panel structure according to claim 5, wherein the metal is a silver conductive ink, a copper conductive ink, a carbon conductive ink or a complex metal conductive ink.

7. The touch panel structure according to claim 5, wherein the inorganic material is an Indium Tin Oxide (ITO), a Fluorine doped tin oxide (FTO), a Zinc oxide (ZnO), an Al-doped ZnO(AZO), or an Indium Zinc Oxide (IZO).

8. The touch panel structure according to claim 5, wherein the organic material is conductive polymers, a Carbon nanotube or a Graphene.

9. The touch panel structure according to claim 1, wherein the plurality of insulated layers are organic materials or an inorganic materials, wherein the inorganic materials are $SiO_2$, $SiN_x$, a photoresist; and the organic materials are an acrylic, epoxy, an ethylene vinyl acetate (EVA) or a photoresist.

10. The touch panel structure according to claim 1, wherein the plurality of Y conductive connecting bridges are organic materials or inorganic materials, wherein the inorganic materials are a metal, a metal composite or a metal oxide; and the organic materials are a conductive ink, a conductive polymer or a conductive carbon.

11. The touch panel structure according to claim 1, wherein the first direction is substantially orthogonal to the second direction.

12. A fabricating method of a touch panel structure, comprising:
patterning a plurality of X conductive electrodes, a plurality of Y conductive electrodes, a plurality of X conductive connecting sections and a plurality of frame wires on a transparent substrate having a touch area and at least one frame wire area by an one-time printing manner, wherein the plurality of X conductive electrodes and the plurality of Y conductive electrodes are respectively arranged in an array in the touch area and interlaced with each other, wherein the plurality of frame wires are disposed in the at least one frame wire area, the plurality of X conductive connecting sections is connected to the plurality of X conductive electrodes adjacent to each other to electrically connect the plurality of X conductive electrodes along a first direction, and wherein an external circuit is electrically connected to the plurality of X conductive electrodes, the plurality of Y conductive electrodes and the plurality of X conductive connecting sections via the plurality of frame wires;
forming a plurality of insulated layers each covering one of the plurality of X conductive electrodes and a portion of two of the plurality of Y conductive electrodes; and
forming a plurality of Y conductive connecting bridges on the plurality of insulated layers, for electrically connecting the plurality of Y conductive electrodes along a second direction,
wherein the transparent substrate is flexible.

13. The fabricating method according to claim 12, wherein the plurality of X conductive electrodes, the plurality of Y conductive electrodes, the plurality of X conductive connecting sections and the plurality of frame wires are printed by gravure off-set printing, ink-jet printing, or nano-imprinting.

14. The fabricating method according to claim 12, wherein the plurality of insulated layers is printed by gravure off-set printing, ink-jet printing, nano-imprinting, or screen printing.

15. The fabricating method according to claim 12, wherein the plurality of Y conductive connecting bridges is printed by gravure off-set printing, ink-jet printing, nano-imprinting, or screen printing.

16. The fabricating method according to claim 12, wherein the first direction is substantially orthogonal to the second direction.

17. A fabricating method of a touch panel structure, comprising:
forming a plurality of Y conductive connecting bridges on a touch area of a transparent substrate;
forming a plurality of insulated layers on the plurality of Y conductive connecting bridges, respectively; and
patterning a plurality of X conductive electrodes and a plurality of Y conductive electrodes, a plurality of X conductive connecting sections and a plurality of frame wires on the transparent substrate by an one-time printing manner, wherein the plurality of X conductive electrodes and the plurality of Y conductive electrodes are respectively arranged in an array in the touch area and interlaced with each other, and the plurality of X conductive electrodes is disposed on the plurality of insulated layers, respectively, to electrically connect the plurality of X conductive electrodes along a first direction, wherein the plurality of Y conductive electrodes covers edges of the plurality of Y conductive connecting bridges, to electrically connect the plurality of Y conductive electrodes along a second direction, wherein the plurality of frame wires is disposed in at least one frame wire area of the transparent substrate, wherein an external circuit is electrically connected to the plurality of X conductive electrodes, the plurality of Y conductive electrodes and the plurality of X conductive connecting sections via the plurality of frame wires,
wherein the transparent substrate is flexible.

18. The fabricating method according to claim 17, wherein the plurality of X conductive electrodes, the plurality of Y conductive electrodes, the plurality of X conductive connecting sections and the plurality of frame wires are printed by gravure off-set printing, ink-jet printing, or nano-imprinting.

19. The fabricating method according to claim 17, wherein the first direction is substantially orthogonal to the second direction.

* * * * *